United States Patent [19]

Schneller

[11] Patent Number: 4,545,847
[45] Date of Patent: Oct. 8, 1985

[54] ROOFING EDGE SEAMING APPARATUS

[76] Inventor: Robert F. Schneller, P.O. Box 335, Loveland, Colo. 80723

[21] Appl. No.: 497,499

[22] Filed: May 24, 1983

[51] Int. Cl.⁴ .............................................. B32B 31/20
[52] U.S. Cl. .................................... 156/579; 156/574; 156/575; 425/87
[58] Field of Search ...................... 425/12, 13, 87, 94, 425/219, 224, 447; 156/574, 575, 579

[56] References Cited

U.S. PATENT DOCUMENTS

| | | | |
|---|---|---|---|
| 3,148,432 | 9/1964 | Garnett | 425/87 |
| 3,368,234 | 2/1968 | Edens | 425/87 |
| 3,795,469 | 3/1974 | Swatzel | 425/219 |
| 3,999,920 | 12/1976 | Cerillo | 425/447 |
| 4,239,581 | 12/1980 | Lang | 156/579 X |
| 4,259,142 | 3/1981 | Kortepeter | 156/579 X |

FOREIGN PATENT DOCUMENTS

| | | | |
|---|---|---|---|
| 2459208 | 6/1976 | Fed. Rep. of Germany | 156/579 |
| 480813 | 10/1975 | U.S.S.R. | 156/574 |

Primary Examiner—Jan Silbaugh
Attorney, Agent, or Firm—William E. Hein

[57] ABSTRACT

A portable roof edge seaming apparatus for aiding in the chemical welding of the edge of a sheet of vinyl roofing membrane to either an overlapped sheet thereof or to a vinyl clad metal edge member includes a fleece or cloth lined skid plate, a solvent reservoir, a brush member mounted forward of the skid plate for applying solvent from the reservoir to an area between the members to be welded, and a weighted roller mounted rearward of the skid plate for applying uniform pressure over the members to which solvent has been applied.

4 Claims, 2 Drawing Figures

ROOFING EDGE SEAMING APPARATUS

BACKGROUND AND SUMMARY OF THE INVENTION

This invention relates generally to the installation of roofing materials and more specifically to an apparatus aiding the installation on a flat roof of a single-ply roofing membrane. Exemplary of such single-ply roofing membranes is that manufactured under the tradename Trocal by Dynamit Nobel of America, Inc. The Trocal roofing membrane comprises a vinyl material that is supplied in rolls of specified width that are unrolled on the roof underlayment material and seamed through the use of conventional chemical welding solvents to form a homogenous skin. The roof skin may then be covered with ½" to 1½" stone ballast. Manufacturer of single-ply roofing membranes also supply metal gravel stops and various drain and vent pipe flashing that are clad with the same vinyl material as that of the roofing membrane itself. Thereby, the roofing membrane can be welded to the gravel stop that forms the perimeter of the roof and the flashing associated with the various drain and vent pipes protruding from the roof to assure a completely waterproofed roof structure. In order to weld the roofing membrane to the clad gravel stop around the perimeter of the roof in accordance with the known technique, the roofer must carry with him a can of welding solvent, a brush, and a sand bag. Solvent is manually applied between the roofing membrane and the clad gravel stop by brushing. In order to achieve a somewhat uniform application of the solvent the roofer must rub his hand over the brush as he pulls the brush between the roofing membrane and the clad gravel stop, resulting in the undesirable coating of the roofer's hand with solvent. This procedure also results in soil contamination of the can of solvent, which must then be prematurely discarded in favor of a fresh, uncontaminated can of solvent. The sand bag is employed to apply pressure over the weld between the roofing membrane and the clad gravel stop, and is moved along the weld following application of solvent by the roofer. Oftentimes, the sand bag does not apply sufficient or uniform pressure to the weld, thus leaving voids in the weld which must then be reworked to avoid potential water leakage. Any such rework is very time consuming and expensive. Furthermore, any spillage onto the roofing membrane from an open can of welding solvent requires that the affected area of the membrane be replaced, another time consuming and expensive operation.

It is therefore the principal object of the present invention to provide a roofing edge seaming apparatus that is portable and that applies welding solvent to the seam to be welded, and that exerts an even pressure on the seam following application of welding solvent.

This and other objects are accomplished in accordance with the illustrated preferred embodiment of the present invention by providing a frame member, beneath which is mounted a skid plate, and above which is mounted a welding solvent reservoir. A brush is provided at the forward end of the frame for receiving solvent from the reservoir and applying it between two members to be welded. A handle is provided midway along the frame by which the operator urges the apparatus along the seam. A weighted roller is mounted at the trailing end of the frame for applying uniform pressure on the seam following application of welding solvent thereto.

DESCRIPTION OF THE PREFERRED EMBODIMENT

Figure 1:
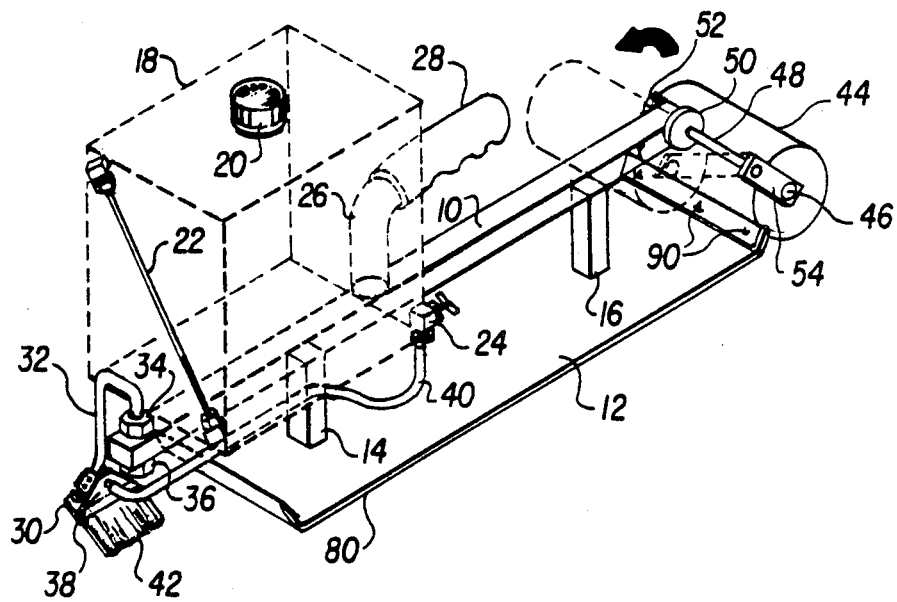
FIG. 1 is an isometric drawing of the roofing edge seaming apparatus of the present invention.
Figure 2:
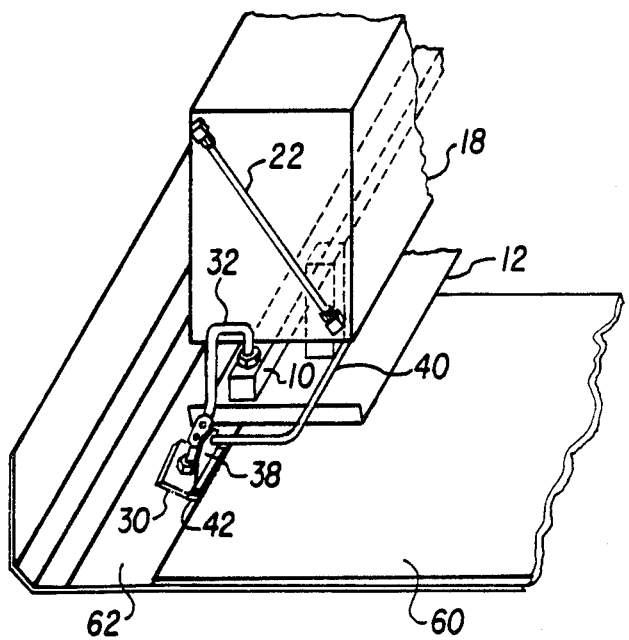
FIG. 2 is a cutaway view of a portion of the apparatus of FIG. 1 illustrating the operation of the apparatus to weld the peripheral edge of a sheet of roofing membrane to a length of clad gravel stop forming the perimeter of the roof.

Referring now to FIGS. 1 and 2, there is shown a frame member 10 that may comprise a length of steel bar or tubing. Frame member 10 is supported above a generally flat steel skid plate 12 by means of a pair of spacers 14 and 16 that may be welded to frame member 10 and skid plate 12 and that may comprise the same material as that of frame member 10. The forward and rearward ends of skid plate 12 are turned up slightly and a number of upwardly pointing tack members 90 are positioned thereon to secure a fleece or cloth material 80 that is stretched over the underside of skid plate 12. Fleece or cloth material 80 serves to absorb any excess welding solvent distributed by the apparatus during operation. A solvent reservoir 18 is mounted on top of frame member 10 adjacent the forward end thereof. Reservoir 18 includes a filler cap 20 and a plastic level tube 22 for indicating the level of solvent therein. A pet cock 24, mounted at a lower corner of reservoir 18, is employed to regulate the flow of welding solvent from the reservoir. A handle member 26 is mounted to frame member 10 rearward of reservoir 18. Handle member 26 includes a rubber handle grip 28. A brush head 30 is mounted on the forward end of frame member 10 by means of a formed bolt 32, one end of which passes through a hole in frame member 10 and the other end of which passes through brush head 30. Formed bolt 32 is thus permitted some freedom of rotation with respect to frame member 10 to facilitate the desired positioning of brush head 30. A pair of locking nuts 34 and 36 serve to lock bolt 32 into a desired position with respect to frame member 10. A solvent diffuser 38, attached to bolt 32 adjacent brush head 30, receives welding solvent from reservoir 18 via a hose 40 that is connected to pet cock 24. Solvent diffuser 38 comprises a small, generally flat cavity of approximately the same width as that of brush head 30 and that is employed for evenly distributing solvent across the butt end of a bristle portion 42 of brush head 30. It is an important feature of the present invention that bolt 32 be formed such that the butt end of brush head 30 is positioned substantially within the vertical plane defined by the adjacent side edge of skid plate 12. This feature is important in permitting the apparatus to be operated in close proximity to any upwardly extending clad gravel edge stop, flashing, etc. to which it is desired to weld the edge of a sheet of roofing membrane.

A weighted roller 44, that may comprise, for example, a lead filled cylinder of approximately the same width as skid plate 12 is mounted to frame member 10 at the trailing end thereof. A bolt 48 having a fixed collar 50 passes through a hole in frame member 10 and is secured for rotation by nut 52. A bracket 54 is attached to an extending end of bolt 48 and to one end of an axle 46 that passes through weighted roller 44. Weighted roller 44 may thus be rotated about bolt 48 from an operating position illustrated in FIG. 1 to a carrying position at rest on frame member 10 illustrated in outline in FIG. 1.

Operation of the roofing edge seaming apparatus of the present invention to weld the peripheral edge of a sheet of roofing membrane to a length of clad gravel stop that typically forms the perimeter of a roof may be understood with reference to FIGS. 1 and 2. The apparatus is aligned with respect to the seam to be welded by positioning the bristle portion 42 of brush head 30 beneath the sheet of roofing membrane 60 and on top of the horizontal portion of clad gravel stop 62. Weighted roller 44 is rotated to the operating position at rest on top of the sheet of roofing membrane 60. Pet cock 24 is then adjusted to permit the desired flow of welding solvent from reservoir 18 to brush head 30. The operator then moves the apparatus along the seam, resulting in the application of solvent between the roofing membrane 60 and the clad gravel stop 62 and in the application of uniform pressure over the seam by the trailing weighted wheel 44 to effect a complete weld. Any excess welding solvent that is distributed by brush head 30 during operation is absorbed by fleece or cloth material 80 as skid plate 12 passes over the seam.

I claim:

1. A portable, hand-held roofing edge seaming apparatus comprising:
    a generally flat, rectangular skid plate having parallel sides and upwardly turned front and rear ends;
    frame means connected to said skid plate, said frame means being centrally, longitudinally positioned above said skid plate;
    handle means connected to said frame means for enabling the user to urge the apparatus along a roofing seam;
    a reservoir connected to said frame means for holding a quantity of a generally liquid roofing solvent;
    brush applicator means swivelably connected to said frame means forward of said front end of said skid plate and generally centrally positioned between said parallel sides thereof, said brush applicator means being positionable, during operation of said apparatus, between two overlapping roofing members to be seamed and being adapted to receive a flow of solvent from said reservoir so as to apply solvent between the two overlapping roofing members to be seamed as said apparatus is urged therealong; and
    weighted roller means connected to said frame means so as to trail rearward of the rear end of said skid plate to apply pressure over a roofing seam to which solvent has been applied by said brush applicator means as said apparatus is urged therealong.

2. A roofing edge seaming apparatus as in claim 1 wherein said upwardly turned front and rear ends of said skid plate include tack means for securing a fleece or cloth material stretched over a bottom surface of said skid plate.

3. A roofing edge seaming apparatus as in claim 1, further comprising:
    valve means coupled to said reservoir to adjust the rate of flow of solvent from said reservoir to said brush applicator means; and
    rotatable bracket means coupled to said weighted roller means for enabling said weighted roller means to be rotated into an inoperative storage position atop said frame means.

4. A roofing edge seaming apparatus as in claim 1 wherein said brush applicator means includes a butt end and a downwardly tilted bristle end and said apparatus further comprises a solvent diffusing cavity attached adjacent said bristle end of said brush applicator means for distributing the flow of solvent from said reservoir to said bristle end of said brush applicator means.

* * * * *